United States Patent [19]

Awdhan

[11] Patent Number: 4,673,452
[45] Date of Patent: Jun. 16, 1987

[54] METHOD OF MAKING FOAM MATTRESS
[75] Inventor: Deo P. Awdhan, Toronto, Canada
[73] Assignee: Reeves Brothers, Inc., Spartanburg, S.C.
[21] Appl. No.: 676,902
[22] Filed: Nov. 30, 1984
[51] Int. Cl.⁴ ............................................. B32B 31/18
[52] U.S. Cl. .................................... 156/254; 156/264; 156/268; 5/481; 83/32; 83/56
[58] Field of Search ............... 156/140, 142, 206, 207, 156/210, 211, 250, 254, 263, 264, 267, 512, 535; 83/27, 29, 32, 56, 861; 5/186 R, 434, 448, 481

[56] References Cited
U.S. PATENT DOCUMENTS

| | | | |
|---|---|---|---|
| 2,953,195 | 9/1960 | Turck | 5/481 |
| 3,222,697 | 12/1965 | Scheermesser | 5/481 |
| 3,258,791 | 7/1966 | Kaplan | 5/481 |
| 3,518,906 | 7/1970 | Albrektson | 83/861 |
| 4,064,578 | 12/1977 | Yamada | 5/481 |
| 4,070,719 | 1/1978 | Morgan | 5/481 |
| 4,106,139 | 8/1978 | Southard | 5/481 |
| 4,143,435 | 3/1979 | Masuda | 5/481 |
| 4,207,636 | 6/1980 | Ceriani | 5/481 |
| 4,276,666 | 7/1981 | Yamada | 5/481 |

*Primary Examiner*—Caleb Weston
*Attorney, Agent, or Firm*—Pennie & Edmonds

[57] ABSTRACT

A process in the manufacture of a mattress for a mattress unit including forming a pattern simultaneously within a surface of each of two bodies of a foamed plastic material in side-by-side juxtaposed position. The surface of each body is cut to present a "checkerboard" convolute pattern.

10 Claims, 6 Drawing Figures

METHOD OF MAKING FOAM MATTRESS

Technical Field

The invention is in the processing of foamed plastic material and similar elastically deformable substances, and to articles of manufacture having a use as a seat cushion, mattress, bed pad, and the like. The invention will be particularly described in its relation to the processing of foamed plastic for use as a mattress

BACKGROUND ART

Articles of manufacture made of polyurethane foam which generally are of the type considered herein, and apparatus for processing the foamed plastic material are known. Representative examples include U.S. Letters Pat. Nos. 2,836,228 (Dahle), 3,009,848 (Simon), 3,186,271 (Kaiser), 3,222,697 (Scheermesser), 3,258,791 (Kaplan), 4,064,578 (Yamada), 4,070,719 (Morgan), 4,106,139 (Southard) and 4,207,636 (Ceriani).

Referring more specifically to the prior art, Dahle discloses a foam cushion embodying a foamed elastomer, such as natural rubber latex, vinyl foam and polyurethane. The cushion comprises a body including a pair of outer foam sections and a frame comprised of a plurality of bonding layers. The outer surfaces of the cushion are flat and the confronting faces of the foam sections are contoured, each to provide a plurality of opposing hills and valleys.

The Simon patent relates primarily to apparatus for cutting slabs of foamed plastic with devices comprising a plurality of knives or hot wires mounted at regular distances from one another. Cutting may be carried out when the slab of foamed plastic is passed between rollers and when the slab of foamed plastic is under compression. The Kaiser patent, like the Simon patent, discloses a manner of processing a slab of foamed plastic for production of an article having a regular or irregular surface contour.

The Scheermesser, Southard and Ceriani patents are each directed foamed articles of manufacture having a surface profile created by apparatus, such as a hot wire. Cutting the profile may be accomplished by relative movement of a block of foam and the hot wire. The block of foam is cut by an undulation of the hot wire to produce two or more substantially identical surfaces. In Scheermesser the surfaces comprise a plurality of parallel ribs and grooves, having a rectangular, triangular, trapezoidal or arcuate cross section, for example: Kaplan discloses a pad having a surface formed by a plurality of protuberances and cavities.

The cushion of the Yamada patent, in appearance, generally duplicates the pad disclosed by Kaplan. The cushion and pad of these patents includes surfaces somewhat likened to an "egg crate" convolute which is supported by a base, such as the mattress of Kaplan so that the contoured surface is exposed.

The Morgan patent relates to a cushioning element having a plurality of intersecting grooves formed in a surface of the body.

SUMMARY OF THE INVENTION

Each of the prior art patents disclose, in one manner or another, an article of manufacture comprising a body of foamed plastic material or similar elastically deformable substance, having a profile formed in an otherwise continuous surface. Typically, a profile may be cut in and throughout an outer surface or surfaces of the body. The cutting of the two profiles may be carried out simultaneously by two cutting instrumentalities as the body of foamed plastic material is compressed during movement by compressing bars, or the equivalent, located along the line of cutting. The prior art also describes that a surface profile may be cut along a line of cutting within a body of foamed plastic, as the body is moved relative to a cutting instrumentality. One or more cuts may be made, and the surface of each slab cut from the body will have a pattern complementary to the surface of the adjacent slab, also cut from the body.

The invention departs from the prior art although the process technique of the invention may be likened to a technique of the prior art, and the article of manufacture produced by the inventive technique may be likened to an article of manufacture formed by the prior art, both described above. Particularly, the invention is directed to the formation of a profile on a surface of each of two or more bodies, simultaneously, as the bodies, disposed in surface-to-surface juxtaposed relation are moved relative to a cutting instrumentality. Each cut will commence along the plane including the surfaces of the juxtaposed bodies. Accordingly, it is possible to simultaneously form a surface profile in two, four, or some multiple of juxtaposed bodies as determined by the number of confronting surfaces.

According to the invention, a pair or multiple pairs of confronting surfaces, each characterized by a "checkerboard" convolute pattern are formed. The pattern differs significantly from the pattern of the prior art formed by moving a single body relative to one or more cutting instrumentalities to cut the body into two or more slabs, with each slab having a surface pattern complementary to the surface pattern of the next adjacent slab cut from the body. This type of cut may produce a surface pattern including a plurality of protuberances and cavities, previously discussed as an "egg crate" convolute pattern. The median plane of the pattern will be determined by the depth of the cavities and the height of the protuberances and reside therebetween. According to the invention, the so-called median plane will coincide with the plane including the confronting surfaces of the juxtaposed bodies and the protuberances of one of the juxtaposed bodies which form the cavities of the other body break away from the body as if they were separately cut. The portions of the protuberances that break away may be likened to the tip portion of the protuberances (from the median plane to the tip) of the "egg crate" convolute pattern.

The invention is considered to improve upon the prior art for several reasons. The improvement is in the technique of processing a foamed plastic material and in the article of manufacture that is formed. To this end, the processing technique of the invention provides for the formation of articles of manufacture at a rate faster than a rate possible in cutting a profile in and throughout an outer surface of a body of foamed plastic material. Since, according to the invention, the profile pattern is cut simultaneously in confronting surfaces of two or more bodies of foamed plastic material the capital costs of equipment are reduced from those costs that would be expected in cutting simultaneously a profile in and throughout opposite outer surfaces of a single body of foamed plastic material. The processing technique of the invention is also capable of producing the article of manufacture in fewer operative steps, which also is reflected in captial cost of equipment. Thus, the articles of manufacture of the invention are produced in a single step, whereas both of the prior art techniques described herein require no fewer than two steps to form the article of manufacture and equipment to carry out the steps. In the first of the prior art techniques, if both outer surfaces of the block of foamed material are cut, it is required to cut the block in half to derive a block with a single cut surface; and in the second of the prior art techniques it is required to truncate or cut the protuberances of the "egg crate" convolute pattern to form the "checkerboard" convolute pattern. To this end, the article of manufacture of the invention has a substantially smooth rather than a bumpy surface of the prior art, and it may have a gauge somewhat less than the prior art which would render the article more flexible.

Further advantages of the invention will appear as the description, to be read in conjunction with the drawing, continues.

The article of manufacture of the invention is considered to be an improvement over the prior art, as well. To this end, the article of manufacture having the "checkerboard" convolute pattern is considered to provide a performance in mattress constructions better than that of the prior art represented by the "egg crate" convolute pattern.

BEST MODE FOR CARRYING OUT THE INVENTION

Figure 1:
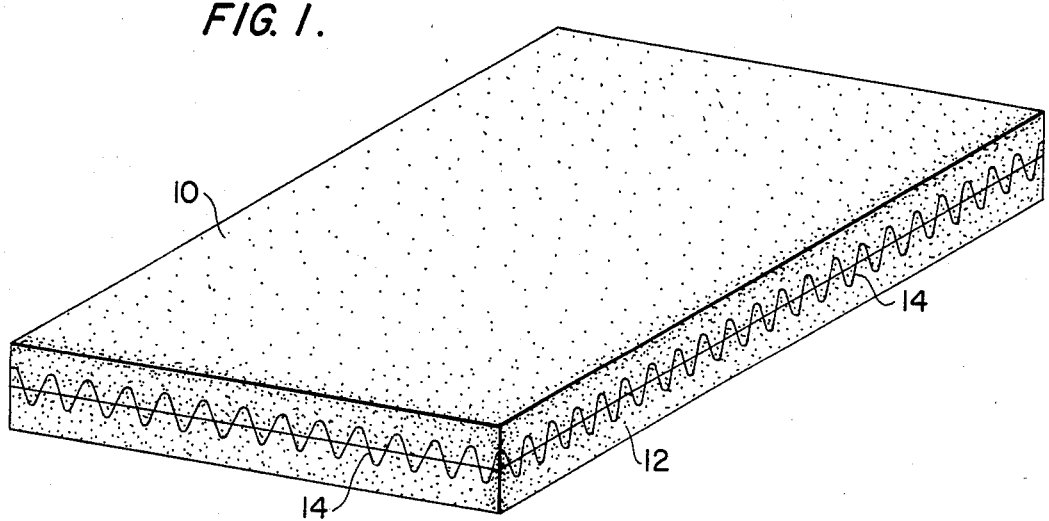
FIG. 1 is a perspective view of a pair of juxtaposed foam pieces following a run through a convolutor illustrating the line of cut in each foam piece.
Figure 2:
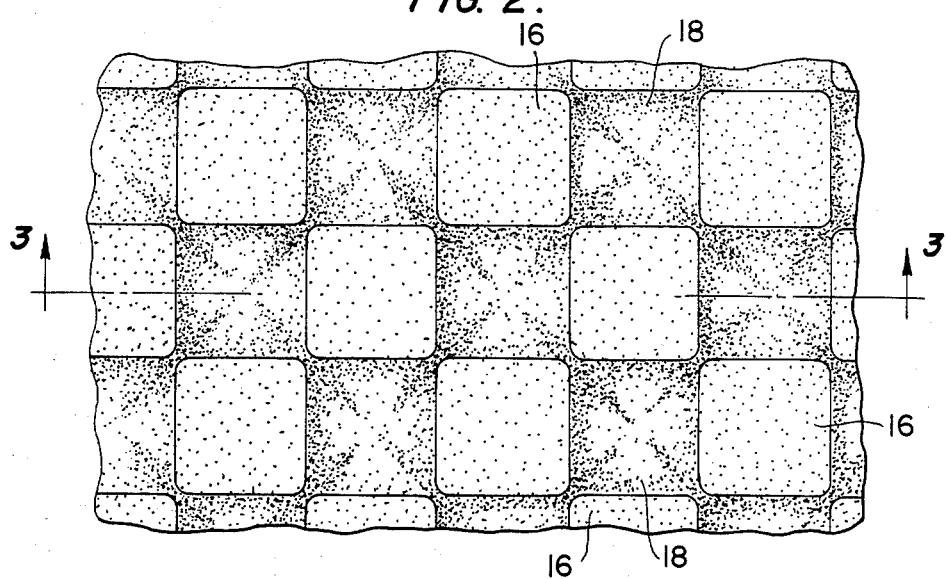
FIG. 2 is a plan view of a portion of the cut surface of one foam piece.
Figure 3:
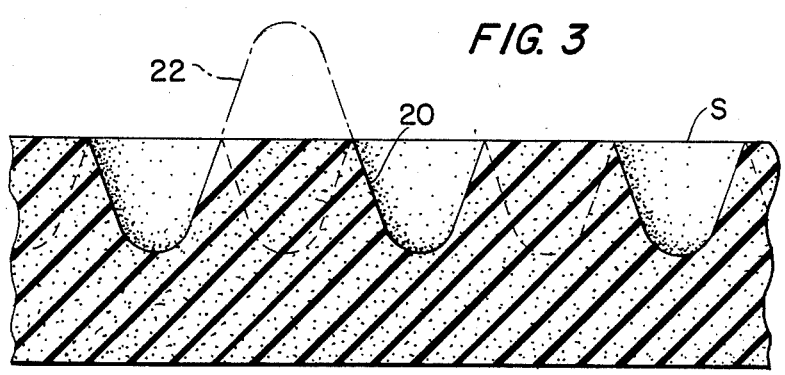
FIG. 3 is a view in section as seen along the line 3—3 in FIG. 2 illustrating a surface that is characterized by a "checkerboard" convolute pattern.

The technique of processing foamed plastic material and the article of manufacture that is formed may be seen generally in FIGS. 1-3. In FIG. 1, two pieces or bodies 10, 12 of a foamed plastic material are illustrated in surface-to-surface, juxtaposed relation prior to undergoing cutting whereby a convolute pattern is cut throughout the juxtaposed surfaces. The manner of cutting a convolute pattern and the equipment is well known to the prior art. Accordingly, the equipment is not shown. FIG. 1, however, illustrates schematically the convolute pattern 14 which is continuous throughout the edges and along the juxtaposed surfaces of each of the bodies.

Each body 10, 12 of foamed plastic material may be of any dimension and thickness required for final use of the article of manufacture. The use may be as a mat, cushion, mattress, and the like. The description will continue with a discussion of a final use of the article of manufacture in the construction of a mattress. Therefore, the dimensions and thickness will be determined by mattress construction specifications.

The foamed plastic material used in bedding manufacture and suitable for use in carrying out the present invention include latex foam rubber, polyurethane foam, both polyester and polyether, and vinyl foams. Because of its ready availability from numerous sources, relative economy and its desirable properties, a polyether and possibly a polyester foam is preferred in the practice of the invention. Good results have been achieved using a flexible polyurethane foam having a weight of from about 1.5 to 1.8 lbs./cu$^3$.

FIGS. 2 and 3 illustrate the convolute pattern formed in the surface of one one of the bodies 10, 12 following the cutting operation. A complementary surface will be formed in the other of the two bodies. The convolute pattern includes a plurality of flats 16 (represented by the light stipling) and a plurality of cavities 18 located between the flats. Thus, as illustrated in FIG. 2, the flats and cavities are located in an alternating arrangement in each row (from right to left in the Figure) and staggered in adjacent rows. Each of the flats, and the openings into the cavities, at the plane of the flats are rectangular in outline. The flats and the openings, however, may be of substantially any geometric pattern. For example, the opening may be round, while the flats will be generally rectangular, having arcuate sides to complete the surface within which the convolute pattern is formed. The cavities will each have a wall surface which inclines uniformly inwardly toward the end. The flats actually represent the upper surface of a protuberance 20 (see FIG. 3). It is preferable that the cutting equipment be centered to act along the line S so that the depth of the cavities in the surface of each body 10, 12 are substantially equal.

As previously discussed, and as evident in FIGS. 1 and 3, the processing of the foamed plastic material is carried out on two bodies in surface-to-surface juxtaposed relation so that after the cutting operation portion 22 of each protuberance 20 will merely break away from the body from which it would have extended, as would have been the case if the cutting operation had been carried out along a line of cutting within a single body. The portion of protuberance that breaks away will be equal in volume to the volume of the cavity that remains in the body.

Figure 4:
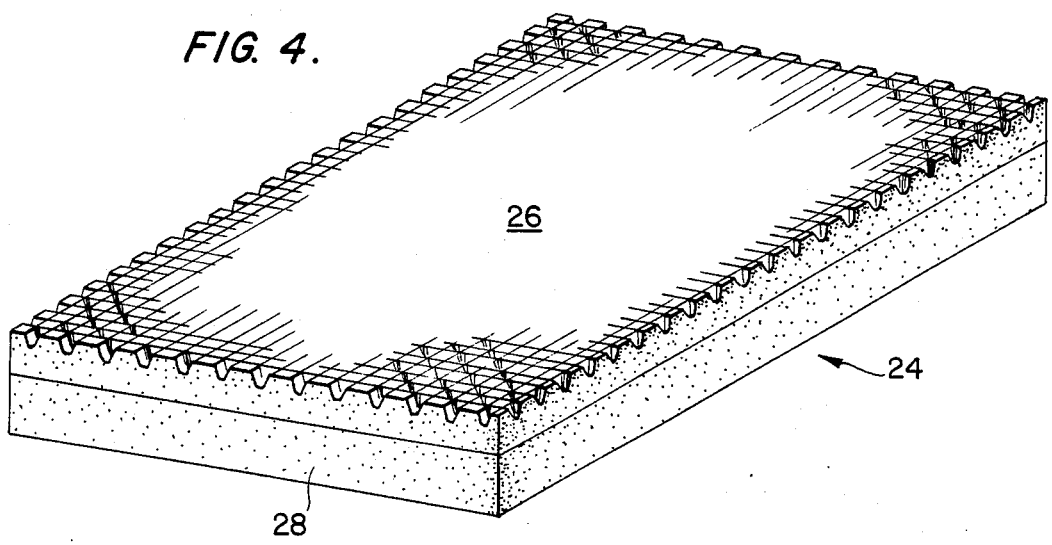
FIG. 4 is a perspective view of a foam piece, having the pattern surface exposed and mounted on a core, illustrating one form of a foam mattress construction.
Figure 5:
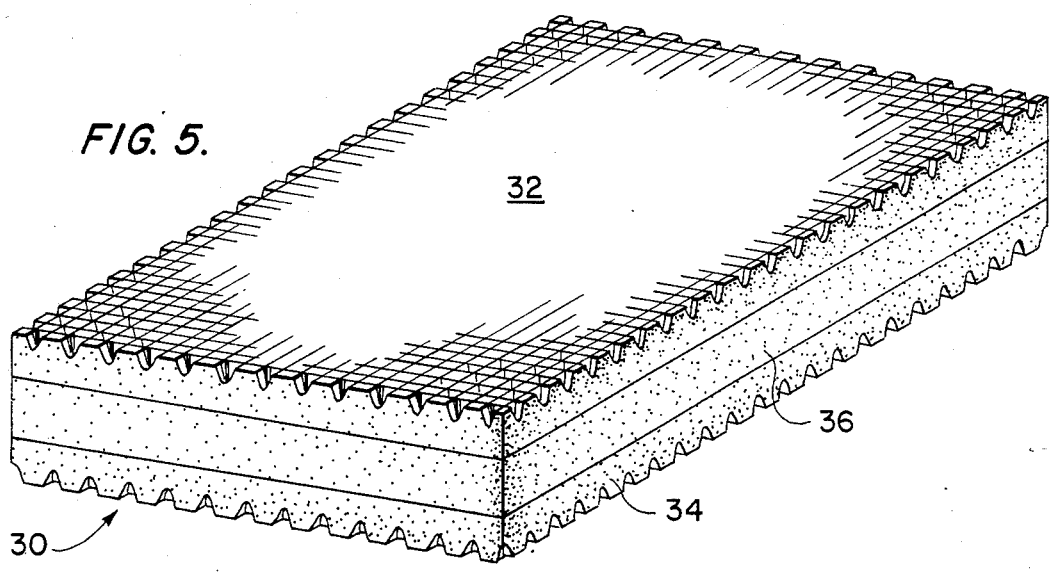
FIG. 5 is a view similar to FIG. 4 illustrating a more preferred form of foam mattress construction having a pair of foam pieces, both with their pattern surface exposed, mounted on opposite sides of a core.
Figure 6:
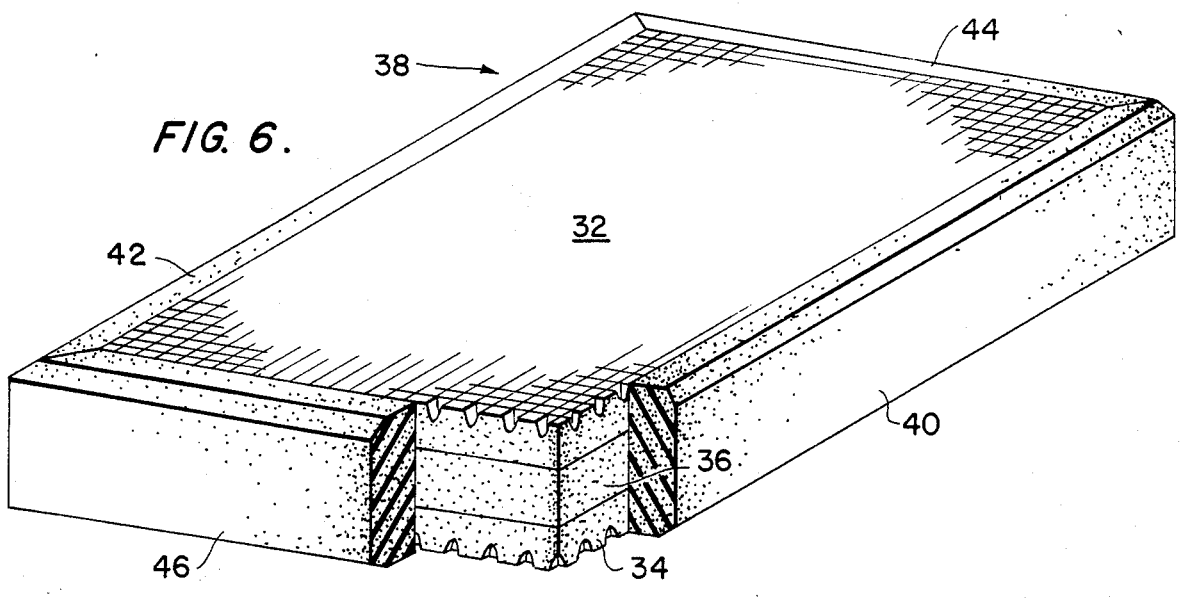
FIG. 6 is a view and construction of a foam mattress construction, like the construction of FIG. 5, having a frame surrounding the core and both foam pieces.

Referring now to FIGS. 4-6, there are illustrated several constructions of mattress units. In FIG. 4 a mattress unit 24 includes a mattress 26 supported on a core 28. In FIG. 5 the mattress unit 30 includes a pair of mattresses 32, 34 supported on opposite sides of a core 36. Each of the mattresses 26, 32 and 34 are of a construction discussed during the discussion of FIGS. 1-3, while the cores 28, 36 may comprise a piece of flexible polyurethane foam identical to the foam from which the article of manufacture is formed.

The mattress unit 30 of FIG. 5 is preferred since it is capable of being reversed for use.

The mattress unit 38 of FIG. 6 generally duplicates the mattress unit 30 of FIG. 5, except that the mattress unit includes a border formed by the side pieces 40, 42 and end pieces 44, 46. The side and end pieces are each bevelled along an outer surface and at their ends. The end bevelling permits assembly of the pieces around the mattress unit 30, and the bevelling of the outer surfaces presents a more pleasing appearance.

The mattress 26, and the mattresses 32, 34 may be cemented to the cores 28 and 36, respectively, by any suitable adhesive in order to facilitate their subsequent handling and wrapping. Suitable adhesives are known to the art and include organic solution or aqueous emulsions of rubber, polyvinyl chloride, polyvinyl acetate and their copolymers, polyurethanes, acrylates, starches, proteins, 100% (neat) adhesives such as hot melts from polyamides or from ethylene-vinyl acetate copolymers, for example. The particular adhesive will be dependent on the plastic foam material that is used. The pieces 40, . . . 46 forming the border may be adhered to the mattress unit 30 in the same manner, and, as discussed in connection with the discussion directed to the material of the core, the border pieces likewise may be formed of flexible polyurethane.

I claim:

1. A process of forming substantially simultaneously a convolute pattern within opposing outer surfaces of at least two bodies of a plastic foam material comprising locating pairs of said bodies in a surface-to-surface juxtaposed position so that said outer surfaces reside substantially in a common plane, cutting said convolute pattern in each of the juxtaposed surfaces of said bodies as said bodies and a cutting instrumentality are moved in relative motion and said cut moves from one body across said common plane to the other body, separating the bodies after said convolute pattern is cut, and allowing a portion of each protuberance of each body extending beyond said outer surface to break away whereby said convolute pattern in the form of a plurality of flats and cavities resides completely within each body.

2. The process of claim 1 wherein said convolute pattern includes a plurality of flats and cavities which alternate in each horizontal row and wherein each flat and cavity in one horizontal row is staggered relative to the flats and cavities in adjacent horizontal rows.

3. The process of claim 2 wherein the area of each flat and opening into a cavity are substantially equal.

4. The process of claim 1 wherein each cavity has a volume substantially equal to the volume of said portion of each protuberance that breaks away from said body.

5. The process of claim 4, wherein the opening into each cavity and each flat are rectangular, and wherein the wall of said cavity tapers gradually from said opening toward an end.

6. A process for the manufacture of one of a mattress unit, a mat, a pad and similar article comprising disposing a first body having a convolute pattern in a surface formed by the process of claim 1 on a core member coextensive in size so that said convolute surface is exposed, and adhering said first body and core member together.

7. A process for the manufacture of one of a mattress unit, a mat, a pad and similar article comprising disposing a first and second body, each having a convolute pattern in a surface formed by the process of claim 1, on opposite surfaces of a core member so that each convolute surface is exposed, said core member and bodies being substantially coextensive in size, and adhearing said first and second body and said core member together.

8. The process of claim 7 including disposing a frame around said first and second bodies and said core member, and adhering said frame to said bodies and core member.

9. The process of claim 6, 7, or 8 wherein at least said first and second body comprises a polyurethane foam.

10. The process of claims 1, 2, 3, 4 or 5 wherein said plastic foam material is polyurethane foam.

* * * * *